April 15, 1958   J. C. MACY   2,830,485
TUBULAR RIVET FORMED FROM STRIP METALLIC STOCK
Filed April 19, 1956

INVENTOR.
James C. Macy
BY:
Olson & Trexler
attys.

United States Patent Office 2,830,485
Patented Apr. 15, 1958

2,830,485

TUBULAR RIVET FORMED FROM STRIP METALLIC STOCK

James C. Macy, Westfield, N. J., assignor to Illinois Tool Works, Chicago, Ill., a corporation of Illinois Application April 19, 1956, Serial No. 579,278

4 Claims. (Cl. 85—40)

The present invention relates to a novel rivet or the like, and more particularly to a novel tubular device adapted to be used as a fastening rivet, a bushing or the like.

An important object of the present invention is to provide a novel tubular rivet or the like which may be rapidly and economically produced in a single step from a strip of sheet stock material whereby substantial savings in manufacturing cost may be effective as compared with heretofore proposed rivet structures which are formed by a plurality of drawing and/or shaping operations.

Another important object of the present invention is to provide a novel tubular rivet which, upon application to an apertured work structure is capable of securely clamping the work structure between its opposite ends whereby substantially to preclude any slight relative movement between the rivet and the work structure.

Still another object of the present invention is to provide a novel tubular rivet of the type mentioned in the preceding paragraph which may be easily and securely applied to the work structure in a manner which substantially eliminates any possibility of the work structure becoming injured as a result of forces applied to the rivet to deform the rivet into a work structure retaining condition.

A more specific object of the present invention is to provide a novel tubular rivet of the above described type having a relatively great resistance to radial collapsing.

Other objects and advantages of the present invention will become apparent from the following description and the accompanying drawings wherein.

Figure 1:
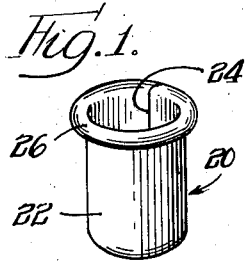
Fig. 1 is a perspective view showing a novel rivet or grommet structure incorporating the features of the present invention.
Figure 2:
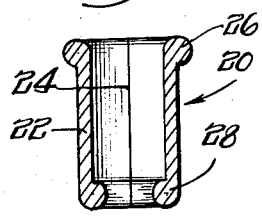
Fig. 2 is a vertical sectional view of the novel rivet or grommet structure.
Figure 3:
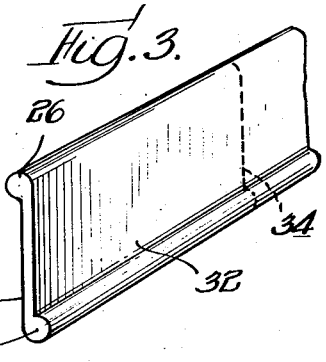
Fig. 3 is a fragmentary perspective view showing a strip of stock material from which a plurality of the novel rivet or grommet structures may be formed.

Referring now more specifically to the drawings, wherein like parts are designated by the same numerals throughout the various figures, a rivet or grommet structure 20 incorporating the features of the present invention is shown in Figs. 1, 2 and 4–6 and comprises a tubular elongated body 22 of sheet metal. The tubular body is split throughout its entire axial length as indicated at 24. A split annular enlargement or bead 26 is provided at the upper or outer end of the tubular body, and a similar split annular integral bead 28 is provided at the bottom or inner end of the body. It should be noted that the inner diameter of the bead 26 is substantially identical to the inner diameter of the tubular body 22 and that this bead projects radially from the outer surface of the tubular body. Thus, the bead 26 provides a head or flange engageable with one side of the work structure. It should further be noted that the outer diameter of the bead 28 is not greater than and is preferably substantially equal to the outer diameter of the tubular body 22 and that this bead projects radially inwardly from the inner surface of the tubular body.

The rivet or grommet 20 may be rapidly and easily formed from a strip 30 of sheet metal stock material which is extruded, rolled or otherwise produced so that it includes the beads 26 and 28 along its opposite margins. When forming a rivet 20 from the strip 30, an end portion 32 of the strip may be easily severed along the line 34 and rolled or otherwise bent into a tubular shape by suitable means, not shown.

Figure 4:
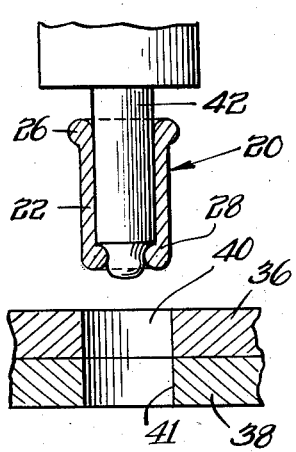
Fig. 4 is a fragmentary sectional view showing the novel rivet or grommet structure and applying means in condition to insert the rivet structure into an apertured work assembly.
Figure 5:
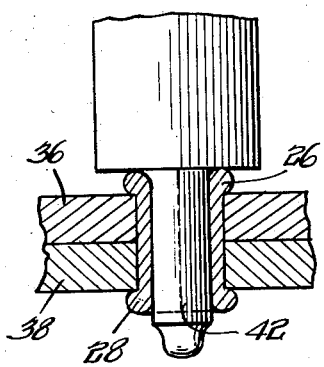
Fig. 5 is similar to Fig. 4, but shows the rivet structure applied to the work assembly.
Figure 6:
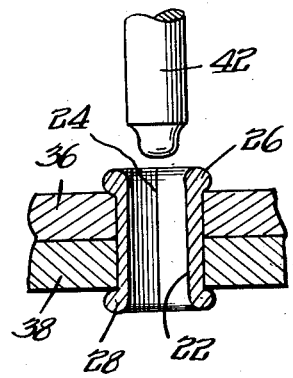
Fig. 6 is a sectional view showing the rivet applied to the work assembly and the tool withdrawn.

The rivet or grommet member 20 may be quickly and securely applied to a work structure which may include a pair of apertured panels 36 and 38 as shown in Figs. 4, 5 and 6. The axial length of the rivet body 22 between the beads 26 and 28 is substantially equal to the overall thickness of the work structure. Thus, upon insertion of the rivet member through aligned apertures 40 and 41 in the work pieces 36 and 38 respectively, the bead 28 will project beyond the inner surface of the panel 38 when the bead 26 abuts the outer surface of the panel 36. The rivet or grommet member 20 may be manually inserted into the work piece apertures or it may be placed on a punch 42 as shown in Fig. 4 for insertion into the work piece apertures. After the bead 26 is seated against the work, downward movement of the punch 42 as shown in Fig. 5 causes the bead 28 to be rolled outwardly and permanently set so as to overlie and engage the inner surface of the work assembly. It should be noted, that as the bead 28 which has a rounded cross section is rolled outwardly and engages the inner surface of the work assembly, the rivet or grommet body is placed under tension so that the work assembly is tightly clamped between the opposite end beads of the rivet.

Figure 7:
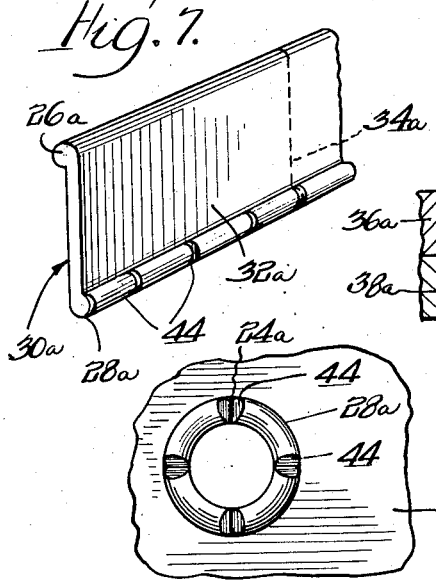
Fig. 7 is a fragmentary perspective view showing a strip of stock material from which a rivet or grommet structure embodying a modified form of the present invention is to be formed.
Figure 8:
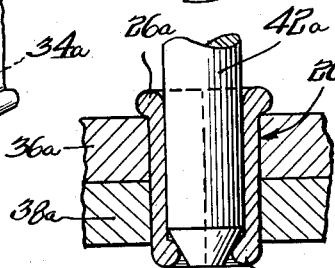
Fig. 8 is a fragmentary sectional view showing the modified rivet or grommet structure partially applied to a work assembly.
Figure 9:
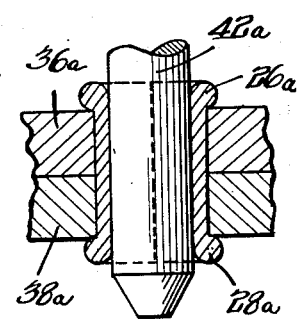
Fig. 9 is a fragmentary sectional view showing the modified rivet or grommet structure fully applied to the work assembly.
Figure 10:
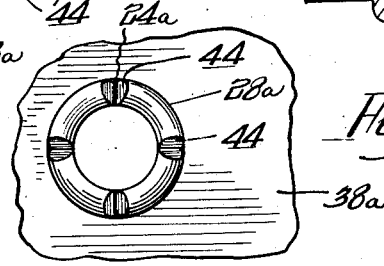
Fig. 10 is a bottom or inner end view showing the modified rivet or grommet device fully applied to the work assembly.

Figs. 7 through 10 show a modified form of the present invention which is similar to the above described embodiment as indicated by the application of identical reference numerals with the suffix a added to corresponding elements. In this embodiment the rivet or grommet entering end bead 28a is provided with a plurality of spaced notches 44, and as shown in Fig. 7 these notches are preferably preformed in the strip of stock material. The notches 44 divide the bead 28a into a plurality of segments which may be even more easily rolled outwardly to work piece clamping positions shown in Figs. 9 and 10 than the continuous uninterrupted bead described above. Thus, the rivet or grommet 20a is particularly adapted to be inserted in the work assembly and set by hand, and the punch 42a may be a hand tool, if desired.

From the above description it is seen that the present invention has provided a novel rivet or grommet structure which may be readily formed from a strip of stock material in a single operation. As a result of the simplified equipment and dies necessary to form the rivet or grommet from the strip material, it is feasible for a manufacturer user of the device to produce them rather than purchase them from a fastener supplier. The novel construction also permits fastener manufacturers or suppliers to effect production economies. It will also be appreciated that the novel rivets or grommets of the present invention have great resistance to radial collapsing as a result of the opposite end rounded beads, and that the rivets or grommets may be easily applied to a work structure in a manner so that the work structure is securely clamped between the opposite end beads.

While the preferred embodiments of the present invention have been shown and described herein it is obvious that many structural details may be changed without departing from the spirit and scope of the appended claims.

The invention is claimed as follows:

1. A rivet type fastener comprising an axially split tubular member formed from a strip of metallic stock and including a tubular body section having an external diameter conforming substantially with the work aperture into which the body is to be inserted, an integral annular bead of solid cross section at one end of said body section projecting radially outwardly beyond the outer periphery of said body section to provide a work engaging shoulder, the outer margin of which is curved substantially in the form of a circular arc from the juncture thereof with the external surface of the body to the outermost extremity of the rivet and which is of such radial thickness as to permit bending into circular form without experiencing fracture, and an integral annular bead of solid cross section at the opposite end of said body projecting radially inwardly of the internal periphery of said tubular body section, the inner margin of said bead being curved from the juncture thereof with the internal surface of the body toward the outer extremity of the rivet to provide a camlike surface for accommodating the annular advancing extremity of an axially inserted tool to effect radial outward rolling of said bead into engagement with a work surface oppositely disposed from the work surface engaged by the first mentioned bead, said tool engageable bead being of such external curvature and cross-sectional size as to permit bending thereof into circular form and subsequent outward rolling thereof into engagement with a work surface without experiencing fracture.

2. A rivet type fastener as defined by claim 1 in which the second mentioned bead is provided with circumferentially spaced portions of reduced thickness to facilitate outward rolling thereof when engaged by said axially inserted tool.

3. A rivet type fastener as defined by claim 1 in which both of the abovementioned beads are of similar cross-sectional contour and are symmetrically positioned with respect to the tubular body portion.

4. A rivet type fastener as defined by claim 1 in which the distance between the beads is normally less than the thickness of the apertured workpiece to which the rivet is adapted for attachment.

References Cited in the file of this patent

UNITED STATES PATENTS

| | | |
|---|---|---|
| 583,309 | McLaughlin | May 25, 1897 |
| 653,798 | Fox | July 17, 1900 |
| 2,155,584 | Bryant | Apr. 25, 1939 |
| 2,333,277 | Swank | Nov. 2, 1943 |
| 2,389,479 | Austin | Nov. 20, 1945 |
| 2,555,420 | Richardson | June 5, 1951 |
| 2,596,952 | Crowther | May 13, 1952 |
| 2,664,458 | Rapata | Dec. 29, 1953 |

FOREIGN PATENTS

| | | |
|---|---|---|
| 126,301 | Germany | Nov. 15, 1900 |